US010150622B1

(12) United States Patent
Wallace et al.

(10) Patent No.: US 10,150,622 B1
(45) Date of Patent: Dec. 11, 2018

(54) SYSTEM AND METHOD FOR MONITORING AN AT LEAST PARTIALLY ENCLOSED BELT CONVEYOR FOR LONGITUDINAL DAMAGE

(71) Applicant: ContiTech Transportbandsysteme GmbH, Hannover (DE)

(72) Inventors: Jack Bruce Wallace, Powell, OH (US); Robert Eugene Leib, Richwood, OH (US)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 15/917,862

(22) Filed: Mar. 12, 2018

(51) Int. Cl.
*B65G 39/16* (2006.01)
*B65G 43/00* (2006.01)
*B65G 43/02* (2006.01)
*B65G 15/08* (2006.01)
*B65G 15/30* (2006.01)

(52) U.S. Cl.
CPC ............. *B65G 43/02* (2013.01); *B65G 15/08* (2013.01); *B65G 15/30* (2013.01); *B65G 2203/0275* (2013.01); *B65G 2203/046* (2013.01)

(58) Field of Classification Search
CPC .................................. B65G 15/08; B65G 15/30
USPC ............... 198/715, 810.03, 810.04, 818, 819
See application file for complete search history.

(56) References Cited

U.S. PATENT DOCUMENTS

| | | | | |
|---|---|---|---|---|
| 6,291,991 B1 * | 9/2001 | Schnell | ................. | B65G 43/02 198/810.02 |
| 7,132,943 B2 * | 11/2006 | Nelson | .................... | F41H 11/12 340/551 |
| 7,178,663 B2 * | 2/2007 | Schnell | .................. | B65G 43/02 198/810.02 |
| 7,494,044 B2 * | 2/2009 | Walsh | .................. | B65D 5/4266 229/117.32 |
| 7,740,128 B2 * | 6/2010 | Wallace | ................. | B65G 43/02 198/618 |
| 7,748,521 B2 * | 7/2010 | Aizawa | .................. | B65G 43/02 198/810.02 |
| 7,766,157 B2 * | 8/2010 | Nishikita | ............... | B65G 43/02 198/810.02 |
| 7,810,634 B2 * | 10/2010 | Wallace | ................. | B65G 43/02 198/810.02 |
| 7,942,258 B2 * | 5/2011 | Wallace | .............. | G01M 13/023 198/810.02 |

(Continued)

*Primary Examiner* — Douglas A Hess
(74) *Attorney, Agent, or Firm* — David L. Cate (57) ABSTRACT

A system is for monitoring a conveyor belt configured to be used as an at least partially enclosed belt conveyor and defining a longitudinal direction. An antenna is embedded in the conveyor belt and extends in the longitudinal direction. The system includes a transmitter for inducing an electrical field in the antenna and a detector for detecting the electrical field induced in the antenna. The transmitter and the detector are arranged in a spaced relationship with respect to the longitudinal direction so as to reduce cross talk between the transmitter and the detector. The conveyor belt is configured to move in the longitudinal direction and convey the antenna past the detector and the transmitter. The spaced relationship and the length of the antenna are mutually configured such that the antenna couples the transmitter to the detector longitudinally as the antenna moves past the detector and the transmitter.

26 Claims, 6 Drawing Sheets

(56) References Cited

U.S. PATENT DOCUMENTS

| | | | |
|---|---|---|---|
| 7,942,259 B2 * | 5/2011 | Steven | B65G 15/08 |
| | | | 198/819 |
| 8,069,975 B2 * | 12/2011 | Wallace | B65G 45/02 |
| | | | 198/810.02 |
| 9,359,147 B2 * | 6/2016 | Wallace | B65G 43/02 |
| 9,551,624 B2 * | 1/2017 | Herhaus | G01L 1/26 |
| 9,809,389 B2 * | 11/2017 | Pauli | G01L 1/00 |
| 2007/0102264 A1 | 5/2007 | Wallace | |
| 2007/0278068 A1 | 12/2007 | Wallace et al. | |
| 2008/0047348 A1 | 2/2008 | Brown | |
| 2008/0257692 A1 | 10/2008 | Wallace | |
| 2009/0078542 A1 * | 3/2009 | Fuchs | |
| 2010/0018841 A1 | 1/2010 | Steven et al. | |
| 2010/0025198 A1 | 2/2010 | Wallace et al. | |
| 2010/0122893 A1 | 5/2010 | Wallace | |
| 2015/0144459 A1 | 5/2015 | Wallace | |
| 2015/0151922 A1 | 6/2015 | Wallace et al. | |
| 2016/0068350 A1 | 3/2016 | Wallace | |
| 2017/0305682 A1 | 10/2017 | Wallace | |

* cited by examiner

SYSTEM AND METHOD FOR MONITORING AN AT LEAST PARTIALLY ENCLOSED BELT CONVEYOR FOR LONGITUDINAL DAMAGE

FIELD OF THE DISCLOSURE

The disclosure relates to a system and a method for detecting longitudinal damage to an at least partially enclosed belt conveyor.

BACKGROUND

This section provides background information to facilitate a better understanding of the various aspects of the disclosure. It should be understood that the statements in this section of this document are to be read in this light, and not as admissions of prior art.

Enclosed conveyor belts, often referred to as pipe or tube conveyors, are conveyor belts which are typically loaded with a material to be conveyed by the belt when the belt is in a flat, open or troughed state. After having the material to be conveyed deposited thereon, the belt can, for example, convey the material in a troughed state or be closed into a tubular- or pipe-shaped configuration.

Antennas can be embedded into conveyor belts for the purpose of detecting damage to the belt. The antennas are oriented such that they run across the conveyor belt transverse to the longitudinal direction of the belt and the direction of travel of the belt. A transmitter for generating an electromagnetic field in the antenna and a detector for detecting the electrical field generated or induced in the antenna by the transmitter are disposed together at a longitudinal position of the conveyor belt system such that the detector and transmitter are adjacent to each other at a spaced relationship with respect to the transverse direction of the belt.

The implementation of such antennas in pipe belt conveyors has been largely ineffective due to cross-talk across the conveyor belt. Cross-talk can occur when a transmitter for inducing an electrical field in an antenna inductively couples directly to a detector that is meant to detect the coupled electrical field induced in the passing antenna. Conveyor belts can also have internal structures which can contribute to an undesirable coupling of the transmitter and the detector. Given that most, if not every, conveyor belt and conveyor structures are different, the strength of a cross-coupled signal can vary with each installation.

SUMMARY

This section provides a general summary of the disclosure, and is not necessarily a comprehensive disclosure of its full scope or all of its features.

It is an object of embodiments of the disclosure to provide a system for monitoring an at least partially closed belt conveyor for longitudinal damage.

The aforementioned object can, for example, be achieved by a system for monitoring a conveyor belt. The system includes: a conveyor belt configured to be used as an at least partially enclosed belt conveyor and defining a longitudinal direction; an antenna embedded in the conveyor belt; the antenna extending with a length L in the longitudinal direction; a transmitter configured to induce an electrical field in the antenna; a detector configured to detect the electrical field induced in the antenna; the transmitter and the detector being arranged in a spaced relationship with respect to the longitudinal direction so as to reduce cross talk between the transmitter and the detector; the conveyor belt being configured to move in the longitudinal direction and convey the antenna past the detector and the transmitter; and, the spaced relationship and the length L of the antenna being mutually configured such that the antenna couples the transmitter to the detector as the antenna moves past the detector and the transmitter.

The object can, for example, also be achieved by a system for monitoring a conveyor belt. The system includes: a conveyor belt configured to be used as an at least partially enclosed belt conveyor and defining a longitudinal direction; an antenna embedded in the conveyor belt; a transmitter configured to induce an electrical field in the antenna; a detector configured to detect the electrical field induced in the antenna; the conveyor belt being configured to move in the longitudinal direction and convey the antenna past the detector and the transmitter; and, the antenna being configured to couple the transmitter to the detector in the longitudinal direction when the antenna is conveyed past the transmitter and the detector.

It is a further object of the some embodiments of the disclosure to provide a method for monitoring an at least partially closed conveyor belt for longitudinal damage.

This object can, for example, be achieved by a method for detecting longitudinal damage to a partially enclosed conveyor belt of a conveyor belt system, the conveyor belt defining a longitudinal direction and having an antenna embedded therein and the conveyor belt system including a transmitter and a detector mutually arranged at a spaced relationship with respect to the longitudinal direction of the conveyor belt. The method includes the steps of: generating an output from the transmitter configured to induce an electrical field in the antenna while the conveyor belt is moving through the conveyor belt system; detecting whether the electrical field was actually induced in the antenna by the transmitter via the detector; and, determining whether the belt has sustained longitudinal damage on the basis of whether the electrical field was detected within at least one of a predetermined amount of time and a predetermined amount of belt displacement.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein.

DETAILED DESCRIPTION

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

A system for monitoring a conveyor belt 1 is configured to detect longitudinal rips in an enclosed conveyor belt or partially enclosed conveyor belt. A partially enclosed conveyor belt can, for example, be a trough belt including a narrow trough belt. The rip detection system can determine whether the conveyor belt has sustained damage while the conveyor belt is advancing through a conveyor system. An enclosed conveyor belt can, for example, be a pipe or tubular conveyor belt, a closed trough conveyor belt such as a Scion® belt and the like. The conveyor belt 1 may also be used as a partially enclosed conveyor belt such as an open trough belt. The belt width of a trough belt can be too narrow for conventional inductive loops to be detected reliably due to the magnitude of cross talk between the transmitter and detector. A tubular conveyor belt has a width, a length and a load bearing region 7.

Figure 1:
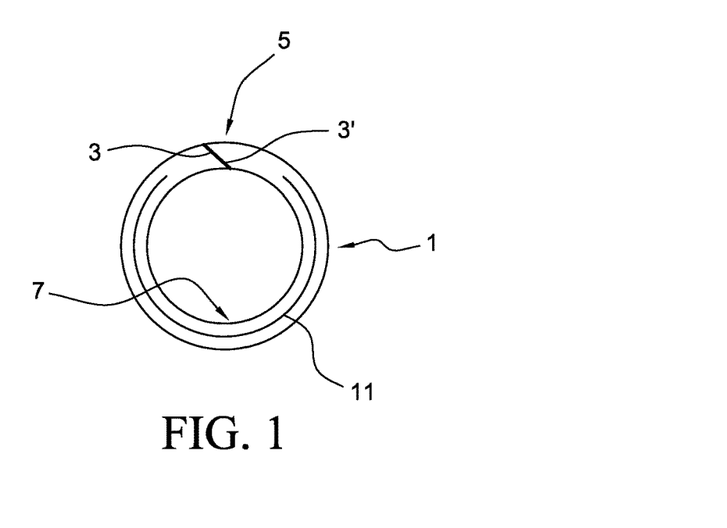
FIG. 1 shows a pipe conveyor belt having an antenna embedded therein, in accordance with the disclosure.

FIG. 1 shows an example of a pipe conveyor belt 1 where the belt edges 3, 3' are arranged in a mutually adjoining manner at a belt edge region 5. The belt 1 defines a load bearing region 7. Typically, material to be conveyed is deposited in the load bearing region 7 when the conveyor belt 1 is in an open state. An antenna 11 is embedded in the belt 1. In the shown embodiment, the antenna 11 does not extend into the belt edge region 5 so as to avoid mechanical interference from the antenna 11 in the edge areas of either side of the conveyor belt 1.

Figure 2:
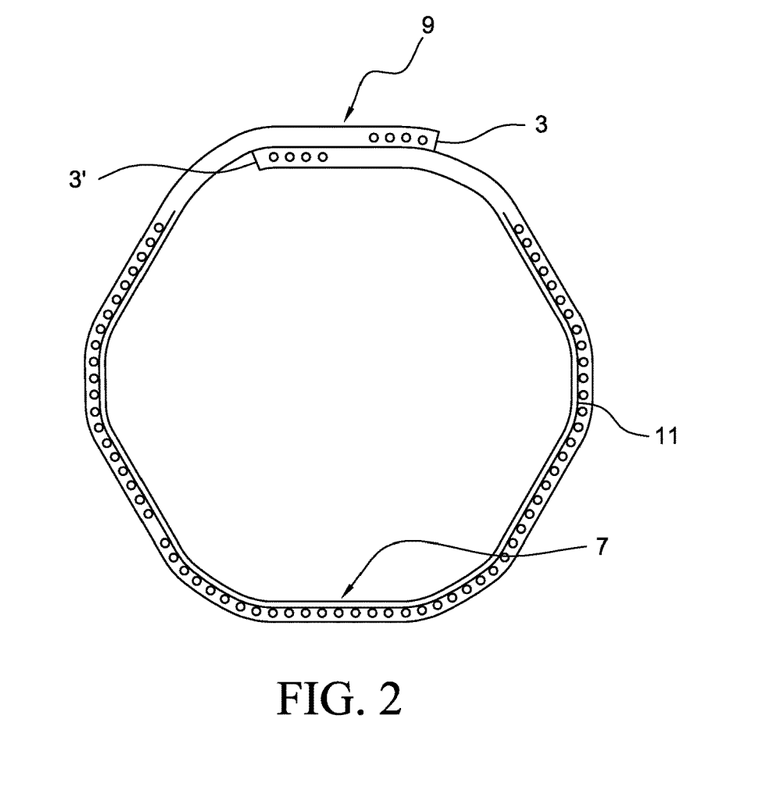
FIG. 2 shows a further configuration of a pipe conveyor belt having an antenna embedded therein, in accordance with the disclosure.

FIG. 2 shows a further embodiment of a pipe conveyor belt 1 wherein the edge regions 5 of the conveyor belt 1 overlap in an overlap region 9 when the conveyor belt 1 is arranged in a tubular shape.

Figure 3A:
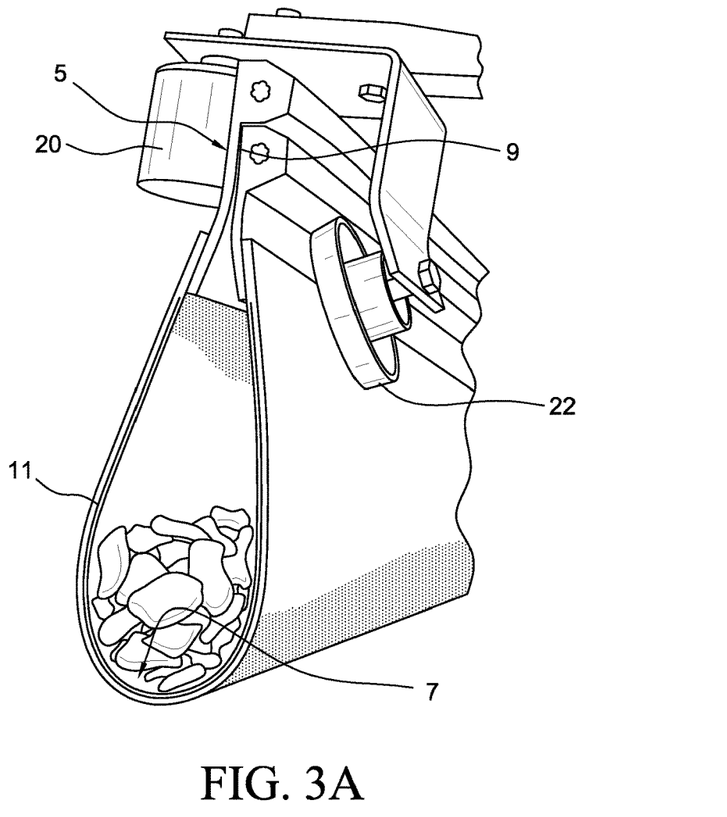
FIG. 3A shows a closed trough conveyor belt configured as a pouched belt, in accordance with the disclosure.
Figure 3B:
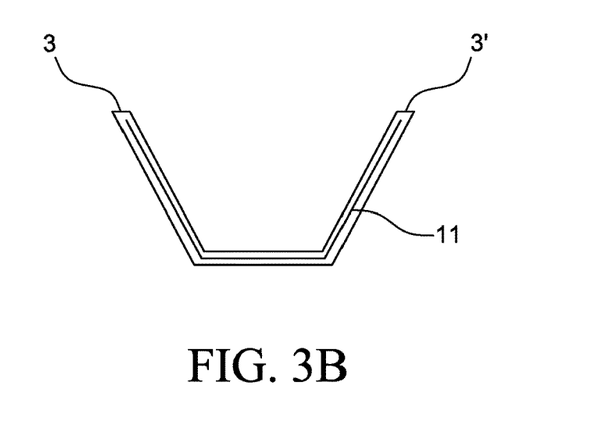
FIG. 3B shows an open trough conveyor belt, in accordance with the disclosure.

FIG. 3A shows a further example of a closed trough conveyor belt 1 which can also be referred to as a pouched belt configuration. The conveyor belt 1 of FIG. 3A can be guided via a vertical guide pulley 20 at an upper edge region 5 of the belt, closed via a support pulley 22 and can form a pouch-shaped area containing the load bearing region 7. The antenna 11 is embedded in the belt 1 and can be embedded in the belt so as to not extend into the overlap region 9 where the two edge areas of the belt overlap each other. The antenna 11 can be designed so as to cover a majority of the transverse width of the conveyor belt 1. FIG. 3B shows an open trough conveyor belt with an antenna 11 embedded therein. The antenna 11 can extend up to the belt edges 3, 3'.

Figure 4A:
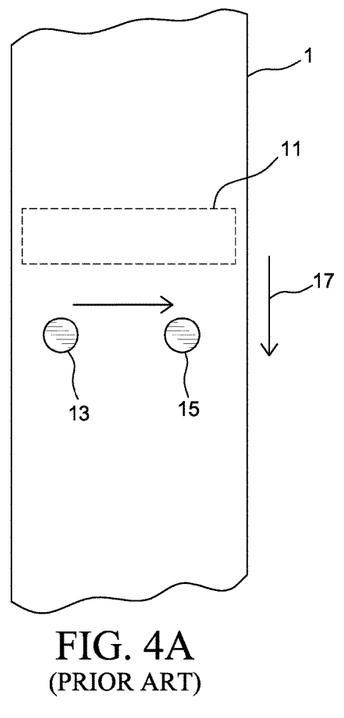
FIG. 4A shows a transverse antenna configured to be coupled across the width of the belt, in accordance with the disclosure.

FIG. 4A is a top plan view of a conveyor belt 1 shown in an open state, that is, not currently configured as a partially enclosed or enclosed conveyor belt. The conveyor belt 1 has an antenna 11 embedded therein in an antenna region. In applications where the conveyor belt 1 is moved through a conveyor system as a flat conveyor belt in the longitudinal direction 17, the transmitter 13 can be configured to be coupled to the receiver or detector 15 across the width of the belt 1 via the antenna 11. When the conveyor belt 1 is, however, configured as a pipe belt or trough belt as, for example, shown in FIGS. 1 to 3B, cross-talk can result between the transmitter 13 and the detector 15 such that the accuracy of a system determining whether the belt 1 has sustained longitudinal damage is negatively affected. The detector 15 may be detecting an electrical field induced in the antenna 11 or a field outputted by the transmitter 13.

Figure 4B:
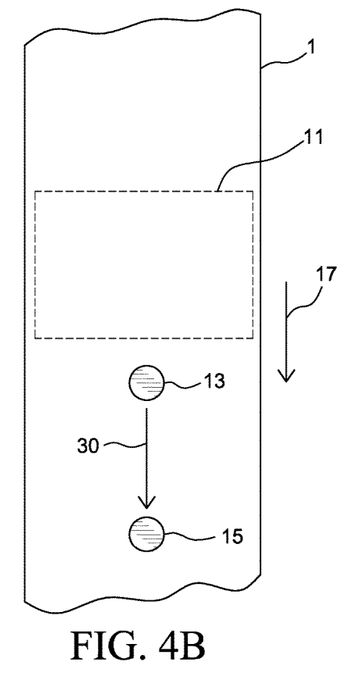
FIG. 4B shows a transverse antenna configured to be coupled along the length of the belt, in accordance with the disclosure.

In FIG. 4B, the transmitter and the detector are arranged at a spaced relationship to each other with respect to the longitudinal direction 17 of the belt 1 and the travel direction of the belt 1. The insert or antenna region extends further in the longitudinal direction of the belt 1 than the antenna region of FIG. 4A. As the antenna 11 passes by the transmitter 13, the transmitter 13 induces an electrical field in the antenna 11. The antenna 11 has a length measured in the longitudinal direction 17. The spaced relationship of the transmitter 13 and the detector 15 and the length of the antenna 11 are mutually configured such that the detector 15 can detect the electrical field of the antenna 11 induced by the transmitter 13 as the antenna 11 moves past the transmitter 13 and detector 15. The transmitter 13, the antenna 11 and the detector 15 form a closed loop when an undamaged antenna 11 passes the transmitter 13 and detector 15. As a result the transmitter 13 can couple longitudinally to the receiver 15 via the antenna 11 in a coupling direction 30. In another embodiment, the spaced relationship between the detector 15 and the transmitter 13 is equal or shorter than the length of the antenna.

The spaced relationship in the longitudinal direction 17 avoids or reduces cross-talk between the transmitter 13 and the detector 15. If reduced levels of cross-talk remain, a filter can be used to address such reduced levels of cross-talk. A background filter can, for example, be used to address remaining cross-talk so as to improve the accuracy of the system. Generally, the closer the detector 15 and the transmitter 13 are arranged with respect to each other, the more cross-talk would be detected by the detector 15. An operator of the conveyor belt can measure the cross-talk caused by the proximity of the detector 15 to the transmitter 13 and can set a filtering level for the filter accordingly.

According to an embodiment, the detector 15 can also include a processor 24 which compares an electrical field detected by the detector 15 to a threshold value. If the detected electrical field is above the threshold, the processor 24 of the detector outputs a signal to a control unit 26. If the control unit 26 does not receive a signal from the processor 24 for a predetermined amount of time or a predetermined amount of movement of the belt 1, the control unit 26 can stop the belt 1 so as to avoid further damage to the belt, inspect the belt, and repair the belt and the like. The processor 24 can also be a separate component from the detector 15.

The belt 1 can have a plurality of antennas 11 embedded therein. The antennas 11 can be arranged at regular intervals. The system can then detect damage to the antennas 11 and thus the belt 1 if the belt has moved more than the spacing between the embedded antennas 11. The displacement or movement of the belt 1 can be determined in a variety of different ways. For example, an encoder, a pulse device, proximity sensor or other similar device can be used to measure belt displacement.

The antennas can also be arranged in a known pattern which can be used by the system in determining whether an electrical field induced in an antenna is expected to be detected at a position of the belt 1. A maximum distance between antennas 11 can also be used by the system to determine damage, that is, damage is determined by the system if the belt 1 moves more than the maximum distance between antennas 11 without detecting a coupled electrical field. RFID chips or tags 19 can also be embedded in the belt 1, providing the system with specific loop identification information with respect to the belt and recorded antenna map. Further, the system can include a belt map indicating the locations of the RFID tags 19 relative to the antennas 11. The belt map can be stored in a storage medium of the system.

Figure 5:
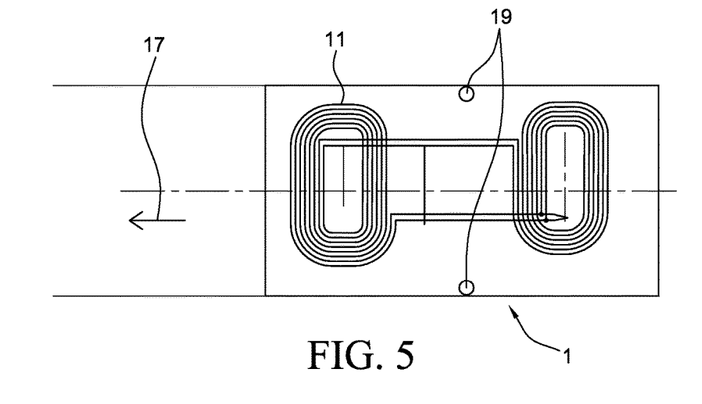
FIG. 5 shows a conveyor belt with an antenna embedded therein, in accordance with the disclosure.

FIG. 5 shows an embodiment of a phase inverting antenna 11 embedded in a belt 1 in an open state. The phase inverting antenna of FIG. 5 has two coiled regions. One of the two coiled regions is wound clockwise, while the second coiled region is wound counter clockwise. When a current is generated in one coil region by the transmitter detector head, the resulting current in the second coil region will be 180 degrees out of phase, or inverted. This second coil region current is what generates the resulting coupled electromagnetic field that would be detected by the receiver detector head. The embodiment shown includes two RFID tags 19 embedded in the belt 1 alongside the antenna 11. A single RFID tag 19 is sufficient to identify the belt location and/or position of the belt 1, though two or more can be provided as a redundancy and/or improve the accuracy of the monitoring system.

Figure 6:
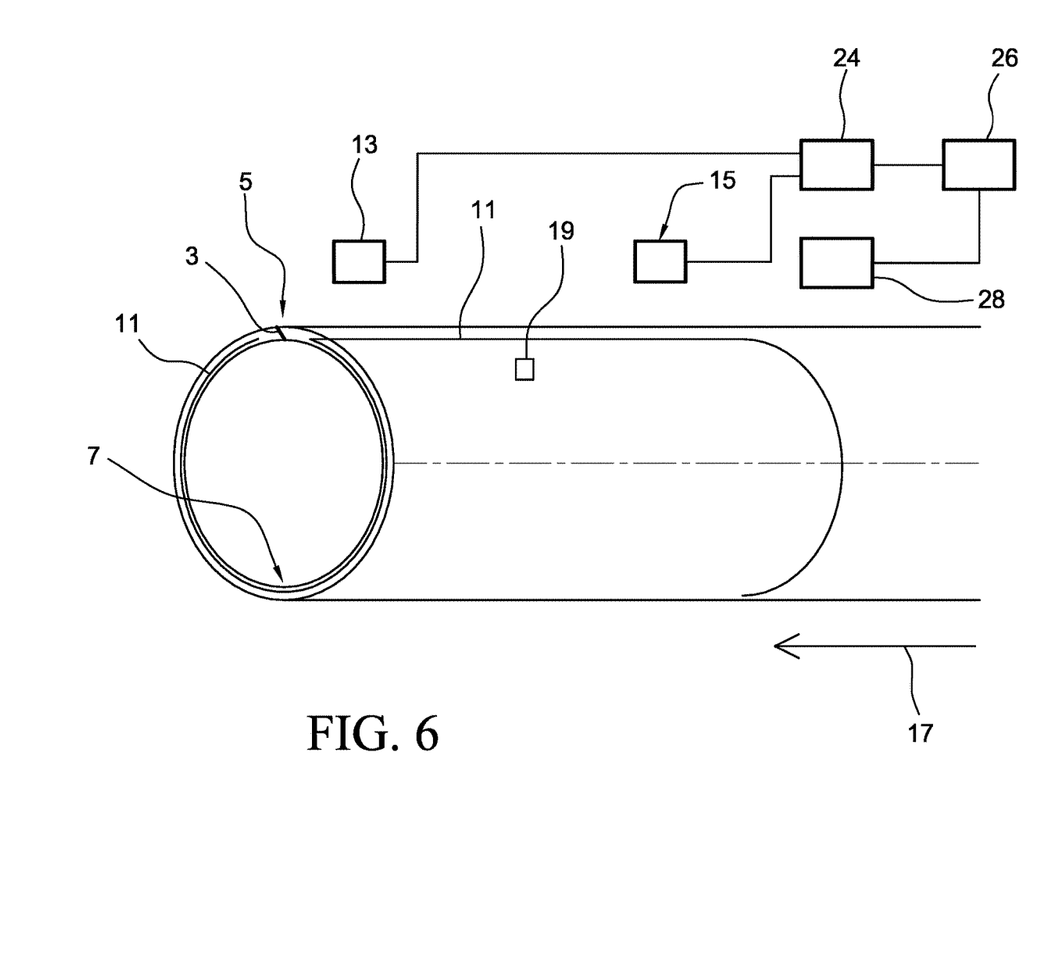
FIG. 6 shows an embodiment of a belt monitoring system, in accordance with the disclosure.

FIG. 6 is a perspective view of a conveyor belt 1 in an enclosed state, here configured as a pipe belt. The transmitter 13 is disposed at a spaced relationship with the detector 15 with respect to the longitudinal direction 17. The detector 15 can include a detector processor 24. The detector processor 24 can be configured to manage the level of cross talk between the transmitter 13 and the detector 15. The detector processor 24 can be used to determine the amount of the signal detected by the detector 15 which is detected directly from the transmitter 13 and an amount detected from the electrical field induced in the antenna 11. A detector processor 24 may also be provided as a separate component of the detector 15.

The antenna 11 has a length L which extends in the longitudinal direction. The length L of the antenna 11 is long enough so as to enable the transmitter 13 to couple to the detector 15 in the longitudinal direction 17 via the antenna 11. The longitudinal direction 17 shown in FIG. 6 can also be directed in the opposite direction. The longitudinal position of the detector 15 and the transmitter 13 can also be reversed. FIG. 6 further shows an RFID tag 19 embedded in the belt 1 in the area of the antenna 11. The RFID tag 19 can be read by an RFID tag reader 28 as the RFID tag 19 passes the tag reader 28. The tag reader 28 can output when an RFID tag 19 is detected to the control unit 26. The detector 15 can also output a signal to the control unit 26 when an electrical field of the antenna 11 is detected. The control unit 26 can, for example, stop the belt when an RFID tag 19 associated with an antenna 11 is detected but no electrical field of an antenna 11 is detected.

Figure 7A:
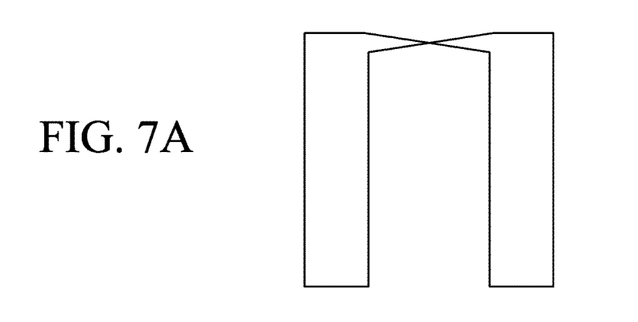
FIGS. 7A to 7C show exemplary embodiments of inverted antenna configurations, in accordance with the disclosure; and, FIGS. 8A to 8C show exemplary embodiments of non-inverted antenna configurations, in accordance with the disclosure.
Figure 7B:
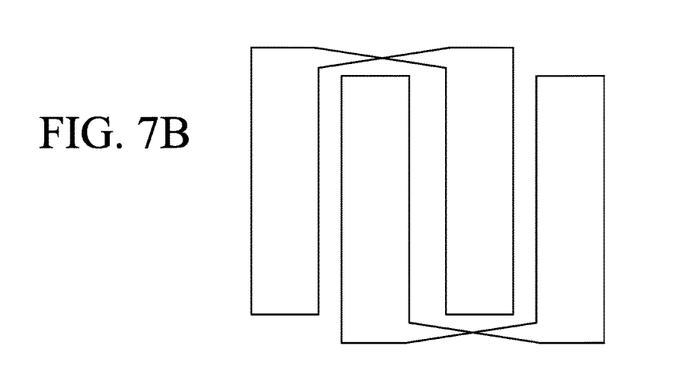
Figure 7C:
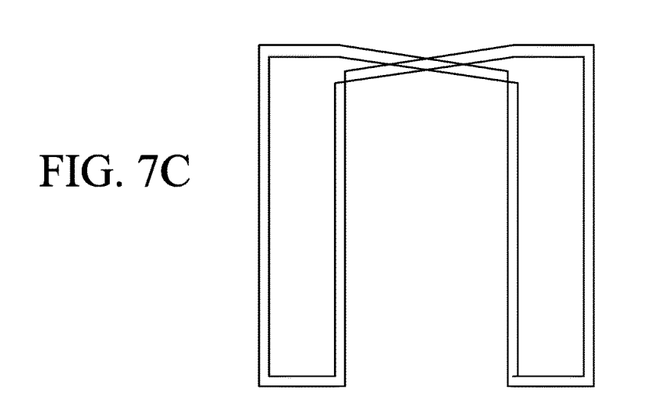

FIGS. 7A to 7C show exemplary inverted embodiments of the antenna 11. FIG. 7A shows an inverted single antenna 11. FIG. 7B shows a double loop inverted single antenna 11 and FIG. 7C shows a parallel loop inverted single antenna 11. An inverted antenna configuration can help to further separate the induced signal of the antenna 11 from cross talk as the induced signal is 180 degrees out of phase with the cross coupled signal.

Figure 8A:
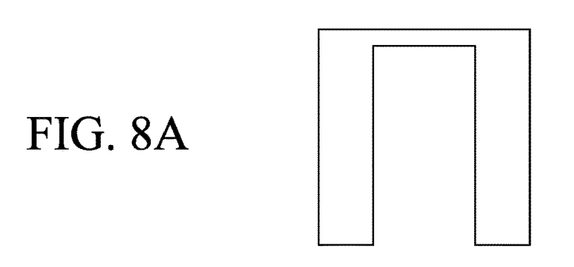
Figure 8B:
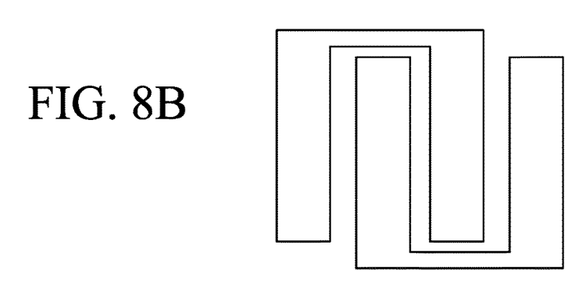
Figure 8C:
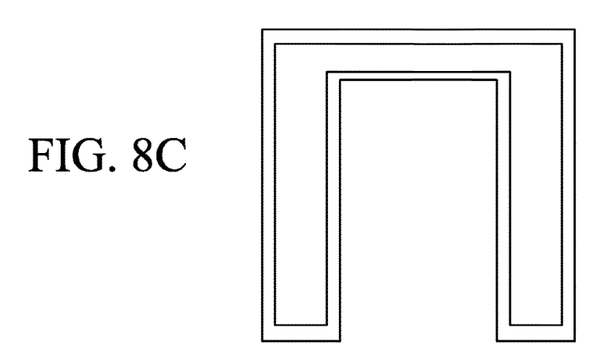

The antenna 11 can, for example, include an inverted loop and/or a non-inverted loop. The antenna can also include a plurality of loops which may be arranged in parallel. FIGS. 8A to 8C show exemplary non-inverted embodiments of the antenna 11. FIG. 8A shows a non-inverted single loop single antenna 11. FIG. 8B shows a double loop non-inverted single antenna 11 and FIG. 8C shows a parallel loop non-inverted single antenna 11.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described.

The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, and gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

LIST OF REFERENCE CHARACTERS

1 Conveyor belt
3, 3' Belt edge
5 Belt edge region
7 Load bearing region
9 Overlap region
11 Antenna
13 Transmitter
15 Receiver/Detector
17 Longitudinal direction
19 RFID tag
20 Vertical guide pulley
22 Support pulley
24 Processor of the detector
26 Control unit
28 RFID tag reader
30 Coupling Direction

What is claimed is:

1. A system for monitoring a conveyor belt, the system comprising:
    a conveyor belt configured to be used as an at least partially enclosed belt conveyor and defining a longitudinal direction;
    an antenna embedded in said conveyor belt; said antenna extending with a length L in said longitudinal direction;
    a transmitter configured to induce an electrical field in said antenna;
    a detector configured to detect said electrical field induced in said antenna; said transmitter and said detector being arranged in a spaced relationship with respect to said longitudinal direction so as to reduce cross talk between said transmitter and said detector;
    said conveyor belt being configured to move in said longitudinal direction and convey said antenna past said detector and said transmitter; and,
    said spaced relationship and said length L of said antenna being mutually configured such that said antenna couples said transmitter to said detector as said antenna moves past said detector and said transmitter.

2. The system of claim 1 further comprising a detector processor configured to determine at least one of an amount of the electrical field detected by said detector directly from said transmitter and an amount of the electrical field detected by said detector from said antenna.

3. The system of claim 1 further comprising a detector processor configured to compare said electric field detected by said detector to a threshold value.

4. The system of claim 3 further comprising a control unit;
    said detector processor being configured to output a signal to said control unit when said electric field detected by said detector is above said threshold value; and,
    said control unit being configured to stop said conveyor belt when said control unit does not receive said signal within at least one of a predetermined amount of time and a predetermined amount of belt movement.

5. The system of claim 3, wherein said detector processor is integrated in said detector.

6. The system of claim 1, wherein:
    said conveyor belt defines a transverse width; and,
    said antenna includes an inductive loop antenna covering a majority of said transverse width.

7. The system of claim 1, wherein said spaced relationship of said detector and said transmitter is equal or shorter than said length L.

8. The system of claim 1, wherein the system includes a plurality of antennas embedded in said conveyor belt at regular intervals.

9. The system of claim 1, wherein said antenna includes a rip detection wire defining a non-inverted loop.

10. The system of claim 1, wherein said antenna includes a rip detection wire defining an inverted loop.

11. The system of claim 1, wherein said antenna includes a first rip detection wire defining a first rip detection loop and at least one second rip detection wire defining a second rip detection loop.

12. The system of claim 11, wherein said first rip detection loop and said at least one second rip detection loop are arranged in parallel.

13. The system of claim 1, wherein said spaced relationship is configured such that said antenna, said detector and said transmitter form a closed loop when said antenna passes said detector and said transmitter.

14. The system of claim 1 further comprising:
a control unit;
said antenna being arranged at a defined location in said belt; and,
said control unit being configured to stop said belt when said detector fails to detect said electrical field induced in said antenna by said transmitter at said defined location of said antenna.

15. The system of claim 1 further comprising:
a control unit;
a data storage device having a belt map stored thereon;
said belt having a belt length B;
the system including a plurality of antennas each embedded in said conveyor belt at respective predetermined locations along said length B;
said belt map identifying each of said respective predetermined locations of said plurality of antennas; and,
said control unit being configured to stop said conveyor belt when said detector fails to detect a respective one of said antennas at one of said respective predetermined locations of said conveyor belt.

16. The system of claim 1 further comprising:
a control unit;
an RFID tag arranged at said antenna and configured to identify said antenna;
a tag reader configured to read said RFID tag as said antenna passes said detector; and,
said control unit being configured to stop said conveyor belt when said tag reader reads said RFID tag and said detector does not detect said electrical field induced in said antenna.

17. The system of claim 1, wherein said conveyor belt is a pipe conveyor belt.

18. The system of claim 1, wherein said conveyor belt is a trough conveyor belt configured to define side walls and an open top when conveying material.

19. The system of claim 1, wherein said spaced relationship is configured such that said detector can detect said electrical field induced in said antenna with substantially reduced cross-talk from said transmitter.

20. The system of claim 1 further comprising a control unit configured to determine damage to said antenna when said belt has moved a predetermined amount without said detector detecting an electrical field.

21. A system for monitoring a conveyor belt, the system comprising:
a conveyor belt configured to be used as an at least partially enclosed belt conveyor and defining a longitudinal direction;
an antenna embedded in said conveyor belt;
a transmitter configured to induce an electrical field in said antenna;
a detector configured to detect said electrical field induced in said antenna;
said conveyor belt being configured to move in said longitudinal direction and convey said antenna past said detector and said transmitter; and,
said antenna being configured to couple said transmitter to said detector in said longitudinal direction when said antenna is conveyed past said transmitter and said detector.

22. A method for detecting longitudinal damage to a partially enclosed conveyor belt of a conveyor belt system, the conveyor belt defining a longitudinal direction and having an antenna embedded therein, the conveyor belt system including a transmitter and a detector mutually arranged at a spaced relationship with respect to the longitudinal direction of the conveyor belt, the method comprising the steps of:
generating an output from the transmitter configured to induce an electrical field in the antenna while the conveyor belt is moving through the conveyor belt system;
detecting whether the electrical field was actually induced in the antenna by the transmitter via the detector; and,
determining whether the belt has sustained longitudinal damage on the basis of whether the electrical field was detected within at least one of a predetermined amount of time and a predetermined amount of belt displacement.

23. The method of claim 22 further comprising:
monitoring a displacement of the conveyor belt; and,
wherein longitudinal damage is determined when the belt is displaced more than a predetermined amount without an electrical field being detected by the detector.

24. The method of claim 22 further comprising the step of:
monitoring a position of the belt;
wherein the antenna is embedded in said belt at a predetermined position; and,
wherein longitudinal damage to the belt is determined when the detector fails to detect an electrical field at the predetermined position.

25. The method of claim 22, wherein the conveyor belt includes a RFID tag arranged at the antenna and configured to identify the antenna, the method further comprising the step of:
reading the RFID tag via a RFID tag reader; and
wherein longitudinal damage to the belt is determined when the RFID tag reader reads the RFID tag and the detector does not detect an electrical field induced in the antenna.

26. The method of claim 22, wherein the system includes a data storage unit having a belt map identifying a position of the antenna in the conveyor belt, the method further comprising the step of:
monitoring a relative position of the conveyor belt in the conveyor belt system;
determining whether an electrical field is to be expected to be detected by the detector based on the relative position of the conveyor belt and the belt map identifying the position of the antenna in the conveyor belt; and,
wherein damage to the belt is determined when it has been determined that an electrical field is to be expected and the detector does not detect the electrical field.

* * * * *